(12) United States Patent
Matson et al.

(10) Patent No.: US 10,109,034 B2
(45) Date of Patent: Oct. 23, 2018

(54) METHOD AND APPARATUS FOR TRACKING AN OBJECT

(71) Applicant: MBDA UK LIMITED, Stevenage Hertfordshire (GB)

(72) Inventors: Gary Paul Matson, Filton (GB);
Andrew John Sherriff, Filton (GB);
Robert James Middleton, Filton (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 0 days.

(21) Appl. No.: 14/908,641

(22) PCT Filed: Jul. 30, 2014

(86) PCT No.: PCT/GB2014/052327
§ 371 (c)(1),
(2) Date: Jan. 29, 2016

(87) PCT Pub. No.: WO2015/015194
PCT Pub. Date: Feb. 5, 2015

(65) Prior Publication Data
US 2016/0171715 A1     Jun. 16, 2016

(30) Foreign Application Priority Data

Jul. 31, 2013 (GB) .................................. 1313682.5

(51) Int. Cl.
*G06K 9/00* (2006.01)
*G06T 3/20* (2006.01)
(Continued)

(52) U.S. Cl.
CPC .................. *G06T 3/20* (2013.01); *G06K 9/46* (2013.01); *G06T 3/4053* (2013.01);
(Continued)

(58) Field of Classification Search
CPC ......... G06T 7/2033; G06T 7/246; G06T 3/20; G06T 3/4076; G06T 3/4069; G06T 3/4053; G06K 9/46; G06K 2009/4666
(Continued)

(56) References Cited

U.S. PATENT DOCUMENTS

H1914 H    11/2000   Watkins
6,483,538 B2   11/2002   Hu
(Continued)

FOREIGN PATENT DOCUMENTS

EP       2575104 A1    4/2013
JP      2005071223 A    3/2005
(Continued)

OTHER PUBLICATIONS

International Preliminary Report on Patentability together with the Written Opinion from related International Application PCT/GB2014/052327 dated Feb. 11, 2016.
(Continued)

*Primary Examiner* — John Strege
(74) *Attorney, Agent, or Firm* — Scully, Scott, Murphy & Presser, P.C.

(57) ABSTRACT

In a method of tracking an object, a plurality of images of a target object is obtained. A super-resolved image of the target object is calculated from the plurality of images. A further image of the target object is obtained. The further image is correlated with the super-resolved image, in order to identify the location of the target object in the further image.

15 Claims, 5 Drawing Sheets

(51) Int. Cl.
*G06T 3/40* (2006.01)
*G06K 9/46* (2006.01)
*G06T 7/246* (2017.01)

(52) U.S. Cl.
CPC .......... *G06T 3/4069* (2013.01); *G06T 3/4076* (2013.01); *G06T 7/246* (2017.01); *G06K 2009/4666* (2013.01)

(58) Field of Classification Search
USPC ........ 382/103, 199, 274, 284, 278, 295; 1/1; 600/437, 443; 250/203.6, 206.1, 225
See application file for complete search history.

(56) References Cited

U.S. PATENT DOCUMENTS

| | | | |
|---|---|---|---|
| 6,987,256 B2* | 1/2006 | English | G01J 4/00 250/203.6 |
| 7,860,344 B1 | 12/2010 | Fitzpatrick et al. | |
| 8,995,793 B1* | 3/2015 | Laflen | G06T 7/40 382/299 |
| 9,036,943 B1* | 5/2015 | Baldwin | G06K 9/00664 382/103 |
| 9,142,251 B2 | 9/2015 | Yang | G11B 20/10296 |
| 9,792,669 B2 | 10/2017 | Matson et al. | |
| 2002/0097342 A1 | 7/2002 | Hu | |
| 2006/0012830 A1 | 1/2006 | Aiso | |
| 2007/0058717 A1 | 3/2007 | Chosak et al. | |
| 2008/0130962 A1 | 6/2008 | Lee et al. | |
| 2008/0199078 A1 | 8/2008 | Lam et al. | |
| 2009/0046902 A1 | 2/2009 | Williams et al. | |
| 2009/0257683 A1 | 10/2009 | Cloud et al. | |
| 2009/0262977 A1 | 10/2009 | Huang et al. | |
| 2009/0297059 A1 | 12/2009 | Lee et al. | |
| 2010/0014709 A1 | 1/2010 | Wheeler et al. | |
| 2010/0172556 A1 | 7/2010 | Cohen et al. | |
| 2010/0259607 A1* | 10/2010 | Kennedy | F41G 7/2253 348/113 |
| 2011/0012900 A1 | 1/2011 | Rotem et al. | |
| 2011/0170784 A1 | 7/2011 | Tanaka et al. | |
| 2012/0051667 A1 | 3/2012 | Kang et al. | |
| 2012/0141042 A1 | 6/2012 | Iketani | |
| 2012/0230555 A1 | 9/2012 | Miura et al. | |
| 2013/0077821 A1 | 3/2013 | Chen et al. | |
| 2013/0084027 A1 | 4/2013 | Koga et al. | |
| 2013/0163851 A1 | 6/2013 | Dalla-Torre et al. | |
| 2014/0043480 A1* | 2/2014 | Wu | H04N 21/2181 348/143 |
| 2014/0064586 A1 | 3/2014 | Peacock, III et al. | |
| 2014/0307971 A1* | 10/2014 | Hanzawa | G06T 3/4053 382/195 |

FOREIGN PATENT DOCUMENTS

| | | |
|---|---|---|
| WO | 2009/091259 A1 | 7/2009 |
| WO | 2009/126445 A1 | 10/2009 |

OTHER PUBLICATIONS

International Search Report dated Nov. 19, 2014 issued in PCT/GB2014/052327.
GB Search Report dated Feb. 13, 2014 issued in GB 1313682.5.
Bailey, D. ("Super-resolution for bar codes," J. Electronic Imaging 10(1), 213-330, Jan. 2001).
Roeder et al. (Assessment of super-resolution for face recognition from very-low resolution images in sensor network, Proc. Of SPIE, vol. 7341, 2009).
U.S. Appl. No, 14/908,625, filed Jan. 29, 2016.
International Search Report dated Nov. 19, 2014 issued in PCT/GB2014/052329.
GB Search Report dated Jan. 31, 2014 issued in GB1313680.9.
Park, Sung Cheol et al., "Super-Resolution Image Reconstruction: A Technical Overview", IEEE Signal Processing Magazine (May 1, 2003), vol. 20, No. 3, pp. 21-36.
International Preliminary Report on Patentability together with the Written Opinion from related International Application No. PCT/GB2014/052329 dated Feb. 11, 2016.
Office Action dated Jan. 6, 2017 from related U.S. Appl. No. 14/908,624 (U.S. Pat. No. 9,792,669).
Notice of Allowance dated Jun. 15, 2017 from related U.S. Appl. No. 14/908,624 (U.S. Pat. No. 9,792,669).
International Preliminary Report on Patentability together with the Written Opinion from related International Application No. PCT/GB2014/052328 dated Feb. 11, 2016.
International Search Report dated Nov. 19, 2014 issued in PCT/GB2014/052328.
GB Search Report dated Feb. 3, 2014 issued in GB 1313681.7.
Office Action dated Jan. 10, 2017 from related U.S. Appl. No. 14/908,625.
Office Action dated Jun. 15, 2017 from related U.S. Appl. No. 14/908,625.
Office Action dated Sep. 21, 2017 from related U.S. Appl. No. 14/908,625.

* cited by examiner

METHOD AND APPARATUS FOR TRACKING AN OBJECT

FIELD OF THE INVENTION

This invention relates to the field of tracking, and in particular to the field of tracking an object recorded in a video stream or other sequence of images. The invention relates especially, but not exclusively, to the field of tracking a target for a homing missile.

BACKGROUND OF THE INVENTION

Improvements in the accuracy of tracking using electro-optical sensors can be expected to result in improved performance. For example, in the field of homing missiles, inaccuracies in tracking reduce the accuracy and/or range of the missile, increasing the risk of the missile missing its target or necessitating later firing of the missile, potentially exposing the platform carrying the missile or its operator to danger for longer than would be the case if the accuracy were improved. In order to provide adequate tracking, the missile may need additional or more advanced image-processing equipment, resulting in increased cost, weight and development risk. However, there are typically limitations on the size and weight of homing missiles; also, missiles often travel at high velocity relative to their target, and so there is also only a limited time available for image-processing calculations. There are therefore, in many cases, significant limitations on the image-processing techniques that can be implemented within a missile. Several prior-art image processing techniques that provide high-quality images are slow and computationally demanding.

It would be advantageous to provide a method and apparatus for tracking an object in which the aforementioned disadvantages are reduced or at least ameliorated.

DISCLOSURE OF THE INVENTION

A first aspect of the invention provides a method of tracking an object comprising the steps of:
(i) obtaining a plurality of images of a target object;
(ii) calculating a super-resolved image of the target object from the plurality of images;
(iii) obtaining a further image of the target object; and
(iv) correlating the further image with the super-resolved image, in order to identify the location of the target object in the further image.

Creating super-resolved images from a plurality of images is a known technique for synthesising a higher-resolution image from a plurality of lower-resolution images. It is used for example in astronomy to generate significant improvements in the resolution of objects of astronomical interest. Super-resolved images can be created, by a variety of techniques well known in the art. The present inventors have recognised that improved accuracy of tracking can be achieved by using a super-resolved image, rather than a single previously obtained image, in the cross-correlation techniques frequently employed in the tracking of an object. By its very nature, a super-resolved image provides an image of higher resolution than any single previous image from the plurality of images. A super-resolved image may thus have higher quality than any single previous image from the plurality of images. For example, the super-resolved image may have higher resolution, contain more information and/or contain less noise, which can improve tracking performance. That improved resolution can of itself provide improved tracking performance, as the result of the correlation can be more accurate as a result of the improved resolution of one of the correlated images (the super-resolved image). Additionally, in calculating the super-resolved image, the plurality of images are registered against each other, and the registration process will result in a reduction of errors in the location of the target object: the effects of jitter due to atmospheric distortion or other random errors in the apparent location of the target in individual images will be greatly reduced by the registration of the images in the calculation of the super-resolved image. Also the effects of image noise (temporal and in some cases fixed pattern) may, in at least some embodiments of the invention, be greatly reduced due to the averaging inherent in the super resolution process. Thus, certain embodiments of the method of the invention may use the extra information (or quality) in the super-resolved image to identify the location of the target object in the further image (which will typically contain less information—or typically be of lower quality—than the super-resolved image), in a manner which is better (more accurate and reliable, for example) than if the location of the target object in the further image were identified without using such a super-resolved image. It will be appreciated that the "further image" is typically not in the form of a super-resolved image. It will be appreciated that the super-resolved image will typically have characteristics different from the "further image". It may be that the correlating is a correlation in the spatial domain. It may be that the correlating is a phase correlation in the frequency domain.

It may be that, prior to correlation with the further image, the super-resolved image is de-resolved, i.e. reduced in resolution back to a resolution of the plurality of images. That may make calculation of the correlation easier, and advantages resulting from the super-resolution are retained, for example the elimination of errors in the location of the target object resulting from the registration of images in the calculation of the super-resolved image and/or the reduction in image noise.

Prior to correlation with the super-resolved image, the further image may be processed, for example by increasing the resolution to the same resolution as the super-resolved image. It will be understood however that the image information contained within and/or the image quality of such a further higher resolution image may be no greater than the lower resolution image from which it is obtained.

It may be that the calculation of the super-resolved image includes averaging all regions of interest that are of the same phase.

It may be that the method is carried out using an imager and at least one general- or special-purpose microprocessor.

Advantageously, the method of the invention may also further utilise a method of generating super-resolved images that is quicker and less computationally demanding than prior-art techniques, being capable of providing super-resolved images even of objects in very rapid motion relative to the detector. Thus, it may be that the method provides the super-resolved images in real time.

It may be that the calculation of the super-resolved image of the target object from the plurality of images includes the steps of:
(a) extracting a current frame portion from the image from the plurality of images, the frame portion being at least a portion of the pixels forming the image, corresponding to a region of interest in the image, the region of interest comprising the target object;

(b) providing a previously calculated current super-resolved frame portion, corresponding to the region of interest in the image; and (c) calculating an updated super-resolved frame portion from the current frame portion and the current super-resolved frame portion.

It may be that the method further comprises repeating steps (a) to (d) a plurality of times. It may be that the calculation of the updated super-resolved frame portion uses a decayed current super-resolved frame portion. This method also has the particular advantage of a low requirement for computer memory. In calculating the updated super-resolved frame portion in a given iteration, it may be that the method takes into account data contained in frame portions obtained in previous iterations, but does not need to store those frame portions, or even the relevant portions of them, in memory. All of the relevant information is contained within the previously calculated current super-resolved frame portion. It may be that the current super-resolved frame portion is decayed by giving it a lower weighting in the calculation of the updated super-resolved frame portion than a weighting given to the current frame portion. It may be that the current super-resolved frame portion is decayed by giving each pixel in the current super-resolved frame portion a lower weighting than a weighting given to each pixel in the current frame portion. Thus, for example, it may be that the value $S_{x,y}{}^n$ of the pixel at (x,y) in the updated super-resolved frame portion calculated in the nth iteration of the method is:

$$S_{x,y}^n = (1-\alpha)F_{x,y}^n + \alpha S_{x,y}^{n-1}$$

$$= (1-\alpha)F_{x,y}^n + \alpha((1-\alpha)F_{x,y}^{n-1} + \alpha S_{x,y}^{n-2})$$

$$= (1-\alpha)F_{x,y}^n + \alpha((1-\alpha)F_{x,y}^{n-1} + \alpha((1-\alpha)F_{x,y}^{n-2} + \alpha S_{x,y}^{n-3}))$$

$$= \ldots$$

$$= \alpha^{n-1}F_{x,y}^1 + (1-\alpha)\cdot(\alpha^{n-2}F_{x,y}^2 + \ldots \alpha^2 F_{x,y}^{n-2} + \alpha F_{x,y}^{n-1} + F_{x,y}^n)$$

$$= \alpha^{n-1}F_{x,y}^1 + (1-\alpha)\sum_{p=2}^{n} \alpha^{n-p} F_{x,y}^p$$

where $F_{x,y}{}^n$ is the (x,y) pixel of the current (i.e. nth iteration) frame portion and a is a constant decay factor, where $0<\alpha<1$, and $S_{x,y}{}^1 = F_{x,y}{}^1$.

It may be that the frame portion extracted in each iteration of step (b) after the first iteration corresponds to a region of interest identified in the image used in the first iteration of step (b).

It may be that the region of interest is defined in a first image and then calculated in subsequent images. It may be that the region of interest is defined in a first image obtained from the imager. It may be that the region of interest is defined by an operator or user.

It may be that the region of interest is defined by an algorithm, for example an object-recognition algorithm.

It may be that the target object is identified in a first image obtained from the imager. It may be that the target object is identified in the first image by a user. It may be that the target object is identified in the first image by a target recognition algorithm.

It may be that the target object is assumed to be in the current image at the position of the target object in a previous image.

It may be that the method of the invention is used to identify the location of only small number (five or less) of target objects in the further image. It may be that the method of the invention is used to identify the location of only one target object in the further image (i.e. a single target object and only a single target object at any given time). It may be that several instances of the method of the invention are used in parallel to identify the location of one and only one target object in the further image, each instance of the method being used to identify a different target object in the further image. Thus, a single set of images (e.g. successive images taken by a single imager) may be analysed in parallel by performing multiple instances of the method of the invention in order to track multiple target objects, but wherein each instance of the method of the invention is used to identify and track the location of one and only one target object in the successive images of the single set.

It may be the super-resolution frame portion is constructed using a registration computed from tracking.

It may be that a shift in the position of the target object in successive images is calculated, and the integer part of the calculated shift is used to shift the region of interest in the later image relative to the position of the region of interest in the earlier image.

It may be that a working frame portion is extracted from the image or each subsequent image. It may be that a working frame portion is extracted from the image and used to identify the location of the region of interest. It may be that the working frame portion is extracted from the approximate location of the target object, for example the same set of pixel locations as were extracted to form the previous frame portion. Particularly in the case where the target object is a fast-moving object, the images obtained may each be much larger (in number of pixels, or area, for example) than the target object as captured within the respective image. Thus, the working frame portion may be relatively small compared to the further image in terms of the amount of the scene that is represented by each of them. It will be understood that the target object may be moving within the image, yet be considered stationary relative to another object. The movement of the target object may be relative to its surrounding environment. The movement of the target object may be relative to the scene from which the images are obtained. The movement of the target object may be relative to the means used to obtain the images.

It may be that the region in an image from which a frame portion is extracted is chosen in dependence, at least partially, on the location of the target object in an image (for example the same image or a previous image) as identified when performing the step of correlating the "further image" with the super-resolved image.

It may be that the change in position of the target in the working frame portion compared with the position of the target in the super-resolved frame portion is calculated. It may be that that change in position is broken down into a shift of a whole number of pixels and a shift of a fraction of a pixel. It may be that the integer shift is used to define a location for a further frame portion, i.e. the location of the preceding frame portion is translated by the integer shift to give the location for the further frame portion. It may be that the pixels forming the further frame portion, corresponding to a re-located region of interest, are extracted. It may be that the step of correlating the further image with the super-resolved image, in order to identify the location of the target object in the further image, forms at least part of the calculation of the change in position of the target in the working frame portion compared with the position of the target object in the super-resolved frame portion.

It may be that the super-resolution process comprises averaging corresponding pixels that are of the same phase in the current frame portion and the previously calculated current super-resolved frame portion. It may be that the super-resolution process includes enlarging the pixels of the region of interest by a super-resolution scale factor and averaging corresponding pixels in the enlarged region of interest and in the previous super-resolved frame portion across all phases, accounting for subpixel shifts.

It may be that the calculation of the super-resolved image includes deblurring the super-resolved image. It may be that the deblurring method is a Bayesian maximum a posteriori method. It may be that deblurring of the summed image is carried out using equations formulated within the image domain.

It may be that the super-resolution algorithm is carried out only on the pixels of the current frame portion that overlap with the pixels of the previously calculated current super-resolved frame portion. It may be that the super resolution algorithm is carried out on all pixels of both the current frame portion and the previously calculated super-resolved frame portion (i.e. including all boundary regions). It may be that the super resolution algorithm is carried out using only the pixels corresponding to the pixels of the frame portion of the first pass of the method.

It may be that the super resolved frame portions are output to a user. Alternatively, it may be that the super resolved frame portions are passed to a further automated unit, where they are used in further automated processes.

It may be that the calculation of the super-resolved image of the target object from the plurality of images includes the steps of:

(a) providing a stack for storing a predetermined number of frame portions;
(b) obtaining an image including a target object, the image being formed by an array of pixels;
(c) extracting a frame portion from the image, the frame portion being at least a portion of the pixels forming the image, corresponding to a region of interest in the image, the region of interest comprising the target object;
(d) storing the frame portion in the stack, the storing including discarding an oldest previously stored frame portion from the stack if the number of frame portions stored in the stack has reached the predetermined number;
(e) repeating steps (b) to (d) a plurality of times; and
(f) calculating a super-resolved image from the plurality of stored frame portions.

It may be the super-resolution image is calculated using the current image stack and the registration of a pair of successive images computed from tracking.

It may be that the translation shift between a pair of images is calculated by a correlation in the spatial domain. It may be that translation shift between a pair of images is calculated by phase correlation in the frequency domain. It may be that the translational shift between a pair of images is calculated by an iterative method in which a translation shift calculated by a correlation in the spatial domain or by a phase correlation in the frequency domain is used as an initial guess to constructed an estimated super resolved image and the registration is adjusted iteratively to produce an improved super resolved image.

It may be that calculating a super-resolved image from the plurality of stored frame portions includes updating a super-resolved image calculated in a previous iteration by changing in the calculation only the phases which have changed in a new frame. It may be that calculating a super-resolved image from the plurality of stored frame portions includes updating a super-resolved image calculated in a previous iteration by removing the oldest frame from its corresponding phase average, adding the new frame to its corresponding phase average, and updating the phase average over phases with the two modified phases.

It may be that the calculation of the super-resolved image includes a deblurring step. It may be that the deblurring is carried out using equations formulated in the image domain, rather than in either the frequency domain or in lexicographic form. It may be that the deblurring is carried out using a Bayesian maximum a posteriori method.

It may be that the calculation of the super-resolved image is bypassed on each iteration until a predefined minimum number of frame portions have been stored on the stack, for example until the stack is full.

A second aspect of the invention provides an image-processing apparatus comprising:
(i) an imager for obtaining a plurality of images and a further image, each including a target object and being formed by an array of pixels;
(ii) an image processor configured to:
 a. calculate a super-resolved image of the target object from a plurality of images;
 b. correlate the further image with the super-resolved image, in order to identify the location of the target object in the further image.

It may be that the image processor is configured to calculate a super-resolved image of a moving target object from a plurality of images, for example a target object that is moving relative to the imager. There may be only a single imager used to obtain the plurality of images and the further image; or it may be that a plurality of imagers is used to obtain the images but all such imagers are located such that there is negligible difference in the viewing angle of the imagers relative to the scene from which the images are obtained. It may be that the image processing apparatus is configured to extract a current frame portion from each image, the frame portion being at least a portion of the pixels forming the image, corresponding to a region of interest in the image, the region of interest comprising the target object;

It may be that the image processing apparatus is configured to:
 obtain a previously calculated current super-resolved frame portion, corresponding to the region of interest in the image; and
 calculate an updated super-resolved frame portion from the current frame portion and the current super-resolved frame portion.

It may be that the image processing apparatus is configured to:
 store the frame portion in the stack, the storing including discarding an oldest previously stored frame portion from the stack if the number of frame portions stored in the stack has reached the predetermined number; and
 calculate a super-resolved image from a plurality of stored frame portions.

It may be that the image-processor includes a super-resolution module configured to retrieve stored regions of interest from the stack and to use a fraction shift of the region of interest in successive images to create a super-resolved image from a plurality of the images.

It may be that the image processor includes a frame grabber configured to obtain the image from the imager. It may be that the image processor includes a region of interest extraction module, to which the frame grabber provides the obtained image.

It may be that the image-processing apparatus includes a graphical user interface for a user to define the region of interest.

It may be that the image-processor includes a shift calculator configured to provide information regarding a shift of the region of interest in successive images.

It may be that the image-processor includes a cross-correlator.

It may be that the image-processor includes a super-resolution module configured to use a fraction shift of the region of interest, for example in successive images, to create a super-resolved image from a plurality of the images.

It may be that the image processor includes a de-resolution module configured to calculate a de-resolved image and to pass it to a cross-correlator.

It may be that the output from the cross-correlator is passed to the shift calculator.

A third aspect of the invention provides a missile seeker including an image processing apparatus according to the second aspect of the invention.

A fourth aspect of the invention provides a computer program product configured to cause, when the computer program is executed, data-processing apparatus to:
  (i) receive a plurality of images of a target object;
  (ii) calculate a super-resolved image of the target object from the plurality of images;
  (iii) obtain a further image of the target object; and
  (iv) correlate the further image with the super-resolved image, in order to identify the location of the target object in the further image.

It will of course be appreciated that features described in relation to one aspect of the present invention may be incorporated into other aspects of the present invention. For example, the apparatus of the invention may incorporate any of the features described with reference to the method of the invention and vice versa.

BRIEF DESCRIPTION OF THE DRAWINGS

Example embodiments of the invention will now be described by way of example only and with reference to the accompanying schematic drawings, of which:

FIG. 4(*a*) is a block diagram showing components of an apparatus according to a first example embodiment of the invention;

FIG. 4(*b*) is a block diagram showing components of an apparatus according to a second example embodiment of the invention;

FIG. 5(*a*) is a flow chart showing steps in a method according to the first example embodiment of the invention;

FIG. 5(*b*) is a flow chart showing steps in a method according to the second example embodiment of the invention;

DETAILED DESCRIPTION

The embodiments of the present invention described below concern improved methods of tracking an object using super-resolution. As will be described in further detail below, a (non-super-resolved) image of a scene is correlated with a super-resolved image of the scene in order to identify the location of a target object in the (non-super-resolved) image. It will be appreciated that the super-resolved image will have different characteristics from the non-super-resolved that will enable better (e.g. more reliable) identification of the location of the target object. The super-resolved image will have different characteristics from the non-super-resolved image and will typically be of higher quality for example. The quality of the super-resolved image will be better in the sense that it has characteristics which enable better tracking of the target object; the super-resolved image will typically have characteristics such as higher effective resolution, lower noise, and more information than the corresponding, typically lower quality, non-super-resolved image. The quality of the super-resolved image may be higher in these ways without necessarily looking (to the human eye if converted into a visible representation of the image) like a better representation of the scene being viewed.

Super-resolution algorithms have been in the open literature for a number of years, but they are slow. In example embodiments of the present invention, continual super-resolution of a region of interest (ROI) within an image is provided in real time.

A straightforward, non-real-time implementation of super resolution takes as its input a stack of low-resolution images and provides as output a single higher-resolution image. To achieve that, three principal processing steps are carried out sequentially, namely registration, summation and deblurring.

In many applications, such as astronomy, where only a single, still, image is required from a historical image stack, very computationally demanding algorithms have been developed, to generate the best possible super-resolved image. In contrast, in example embodiments of the invention, it is not the best possible super-resolved image that is sought, but rather an image that is 'good enough' and that can be constructed in the time available (e.g. milliseconds), on the hardware available (e.g. embedded processors). In example embodiments of the present invention, continual super-resolution of a region of interest (ROI) within an image is provided in real time.

A typical missile seeker will have a sensor array of at least 320×240 pixels, and for a number of reasons it is not realistic to attempt to super-resolve the entire scene. One reason is processing power and memory requirements: there are simply too many pixels to carry out super resolution in a reasonable time, even with a powerful processor. Another reason is that, if the target motion and background motion are different, it will not be possible to super resolve both and, in a typical scenario where the target is small, doing so would result in an image in which the background was super-resolved but the target was smeared out, which would be worse than the original image. It is desirable instead to super-resolve a small patch of the image denoted as a region of interest (ROI).

The method according to a first example embodiment reduces greatly the processing power and memory required to construct the super-resolution image. This method works with the new ROI and the current super-resolution image, which has been calculated in a previous iteration of the method. At each time step, the new ROI is registered to sub-pixel accuracy with the de-resolved version of the current super resolution image. The current super-resolution image is subsequently decayed by a predetermined factor and the new ROI image added; the value of the decay factor dictates how many frames an ROI is included in the super resolution before its contribution becomes negligible.

In the super-resolution of an ROI, the ROI from the most recently captured image is combined with the super-resolved image calculated in the preceding pass of the method. Thus, the super-resolved image is, on each pass of the method, updated with the latest ROI. The weight given in the calculation of the super-resolved image to the ROI from each pass of the method is decreased as the ROI becomes older; i.e. earlier ROIs are given less weight in the calculation than later ROIs.

In a second example embodiment of the invention, an image stack is constructed, and each image within the stack contains the target of interest. The image stack is then processed to construct the super resolved image. When provided with an image sequence, a target is defined in the first frame (either by an operator or by some upstream algorithm) and a region of interest around this target extracted and added into position one of the image stack. At this stage, super resolution of the image stack (with only a single image) yields simply the original image.

In both example embodiments, in subsequent frames, the designated target is tracked and further ROIs extracted. The target is tracked by cross-correlation using a deresolved version of the current super-resolution image. The deresolved version of the super-resolution (SR) image is a prediction of what the image should look like at the base resolution of the sensor. It is inherently very stable, and contains less noise than any of the isolated images because the noise has been averaged out by the SR process. Also, a number of the computations carried out to do tracking in this way can be reused by the SR process to reduce computational load.

When provided with an image sequence, a target is defined in the first frame (either by an operator or by some upstream algorithm) and a region of interest around this target extracted. At this stage, super resolution of the ROI yields simply the original ROI.

When provided with a new frame, an image patch is extracted at the approximate location of the ROI. On the assumption that the target motion within the field of view is small, this can simply be the ROI position from the previous frame; if that is not the case a more sophisticated tracker can be used to seed the approximate ROI position. This image patch is registered to sub-pixel accuracy with the deresolved version of the current SR image. The integer part of the computed shift is used to shift the extraction window within the field of view and the new target ROI is extracted, such that only a fractional shift exists. This fractional part of the shift is propagated into the SR algorithm to provide the sub-pixel motion required by the algorithm.

In the first example method, in frame two, the extracted ROI is combined with the frame one ROI in the super-resolution algorithm, with the frame one ROI given a lower weight than the frame two ROI. Moving onto the third frame, the ROI is combined with the super-resolved image calculated from the first and second frames, with the super-resolved image given a lower weight than the ROI, and so on. The SR image will continue to be updated as more ROIs are provided. However, the contribution of each ROI to the super-resolution image is limited, to avoid a large time difference between the newest and oldest ROI (which increases the chance of an image distortion occurring, e.g. a perspective change, which is not modelled by the SR algorithm in this example).

Thus, in this example, the value $S_y$ of the pixel at (x,y) in the super-resolved image frame portion calculated in the nth iteration of the method is:

$$S_{x,y}^n = (1-\alpha)F_{x,y}^n + \alpha S_{x,y}^{n-1}$$

$$= (1-\alpha)F_{x,y}^n + \alpha((1-\alpha)F_{x,y}^{n-1} + \alpha S_{x,y}^{n-2})$$

$$= (1-\alpha)F_{x,y}^n + \alpha((1-\alpha)F_{x,y}^{n-1} + \alpha((1-\alpha)F_{x,y}^{n-2} + \alpha S_{x,y}^{n-3}))$$

$$= \ldots$$

$$= \alpha^{n-1}F_{x,y}^1 + (1-\alpha)\cdot(\alpha^{n-2}F_{x,y}^2 + \ldots \alpha^2 F_{x,y}^{n-2} + \alpha F_{x,y}^{n-1} + F_{x,y}^n)$$

$$= \alpha^{n-1}F_{x,y}^1 + (1-\alpha)\sum_{p=2}^{n}\alpha^{n-p}F_{x,y}^p$$

where $F_{x,y}^1$ is the (x,y) pixel of the current (i.e. nth iteration) frame portion and $\alpha$ is a constant decay factor, where $0<\alpha<1$, and $S_{x,y}^1 = F_{x,y}^1$. It will be seen that as $\alpha$ tends to unity, the current frame portion contributes less to the updated super-resolved frame portion, whereas as a tends to zero, the previous frame portions (and therefore the super-resolved frame portions) contribute less to the updated super-resolved frame portion. Thus, in between these two extremes the value of $\alpha$ dictates the proportion of relative contribution to the updated super-resolved frame portion, as between the current frame portions and previous frame portions.

The previously computed image registrations do not need to be adjusted, as they are all already incorporated into the current SR image. After this process, the super-resolution calculation only uses ROIs that differ by a fraction of a pixel, as the integer pixel shift has been accounted for in the extraction process. The traditional first step of super-resolution processing is to compute the registration of all the images to a single master image, but in this example method that has already been computed, and so is not repeated; instead it is an input to the main super-resolution processing function, which computes the sum of the present ROI and the previous super-resolved ROI, and carries out deblurring.

The summation process comprises enlarging the ROI pixels by the super-resolution scale factor and calculating, for the enlarged ROI and previous super-resolved image, an average for each pixel, accounting for the sub-pixel shift. This step results in a blurred super-resolution image.

In the second example method, in frame two, the extracted ROI is added to position two of the image stack and super-resolution carried out on the image pair. Moving onto the third frame, the ROI is added to position three of the stack and so on until the image stack is fully populated. The SR image will continue to be refined as more images are added to the stack. However, the stack is of finite size, because the computational burden increases the larger it is, and also because a large stack implies a large time difference between the newest and oldest ROI (which increases the chance of an image distortion occurring, e.g. a perspective change, which is not modelled by the SR algorithm in this example).

Once the image stack is fully populated, subsequent images are added into the stack by removing the oldest ROI and inserting the new one. The previously computed image registrations do not need to be adjusted, as they are all calculated referenced to the SR image. This results in the image stack being a sliding window of ROIs, depicted in FIG. 10, in which the uppermost frame 700 of each stack 1-9 represents the new (current) frame, the bottom 1, 2, 3 and 4 frames 720 in stacks 6 to 9 represent the discarded (past) frames, and the other frames 710 represent frames stored in the stacks from previous iterations (the bottom 1, 2 and 3 frames in stacks 2, 3 and 4 respectively, and the four frames below the uppermost frame in stacks 5-9).

After this process, the image stack only contains ROIs that differ by a fraction of a pixel, as the integer pixel shift has been accounted for in the extraction process. The traditional first step of super-resolution processing is to compute the registration of all the images to a single master image, but in this example method that has already been computed, and so is not repeated; instead it is an input to the main super-resolution processing function which now only computes the image sum and carries out deblurring.

The summation process comprises first averaging all images that are of the same phase (i.e. have the same fractional shift) and then enlarging those average images of each phase by the super-resolution scale factor and averaging pixels across all phases, accounting for the sub-pixel shifts. This step results in a blurred super-resolution image. Processing in this stage of the algorithm can be reduced considerably by observing that a great deal of the computation is repeated at each frame and hence the results can be saved and reused instead of recomputed. For each new image a maximum of two phases are changed: the phase containing the image that is removed from the stack and the phase containing the image that is added to the stack. All the other phases remain the same, and so do not need to be recomputed.

Figure 7:
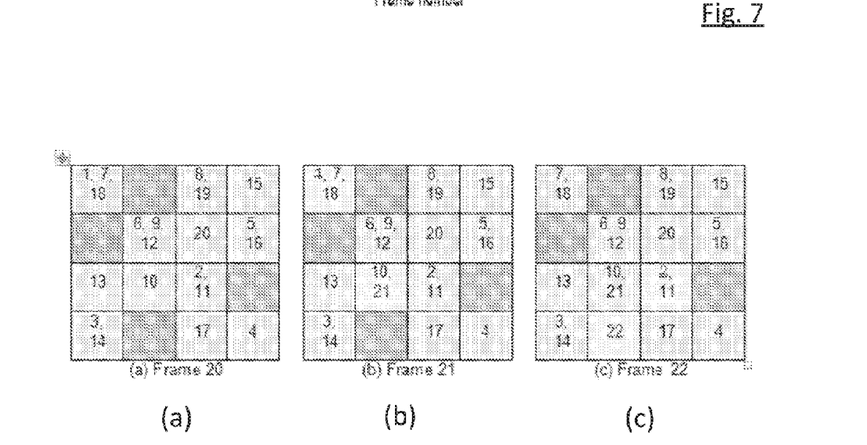
FIG. 7 is a representation of a method according to an example embodiment of the invention, for a low resolution pixel corresponding to a 4×4 array of high-resolution pixels, and for a stack size of 20, with the numbers in each high resolution pixel denoting the frame numbers having a phase shift corresponding to that high-resolution pixel.

An example to describe this process is now given (FIG. 7) for a super-resolution magnification factor of four, in which each low-resolution pixel is sub-divided into a 4×4 grid, resulting in a total of 16 different phases, for a stack size of 20. The array in FIG. 7(a) gives an example coverage map of 20 image frames. If each image is shifted by the computed phase shift, the super resolution image in this example is constructed as:

$$I_{SR} = \frac{1}{12}\left(\frac{I_1 + I_7 + I_{18}}{3} + \frac{I_8 + I_{19}}{2} + I_{15} + \frac{I_6 + I_9 + I_{12}}{3} + I_{20} + \frac{I_5 + I_{16}}{2} + I_{13} + I_{10} + \frac{I_2 + I_{11}}{2} + \frac{I_3 + I_{14}}{2} + I_{17} + I_4\right)$$

where $I_{SR}$ is the intensity of the super-resolution pixel, and $I_n$ is the intensity of the nth image frame in the stack.

If, for the next frame (FIG. 7(b)), image 1 is removed from the stack and image 21 is added at the same phase as image 10, the new super-resolution image is constructed as:

$$I_{SR} = \frac{1}{12}\left(\frac{I_7 + I_{18}}{2} + \frac{I_8 + I_{19}}{2} + I_{15} + \frac{I_6 + I_9 + I_{12}}{3} + I_{20} + \frac{I_5 + I_{16}}{2} + I_{13} + \frac{I_{10} + I_{21}}{2} + \frac{I_2 + I_{11}}{2} + \frac{I_3 + I_{14}}{2} + I_{17} + I_4\right)$$

(Note the change in the $1^{st}$ and $8^{th}$ terms of the summation.) If, for the next frame, FIG. 7(c), image 2 is removed and image 22 is added at the phase in between images 14 and 17, the new super-resolution image is constructed as:

$$I_{SR} = \frac{1}{13}\left(\frac{I_7 + I_{18}}{2} + \frac{I_8 + I_{19}}{2} + I_{15} + \frac{I_6 + I_9 + I_{12}}{3} + I_{20} + \frac{I_5 + I_{16}}{2} + I_{13} + \frac{I_{10} + I_{21}}{2} + I_{11} + \frac{I_3 + I_{14}}{2} + I_{22} + I_{17} + I_4\right)$$

(Note the change in the $9^{th}$ term, the introduction of the $I_{22}$ term, and the change in the denominator of the multiplier outside the bracket.)

(In each of the preceding two equations, the difference from the previous frame is emphasised by means of a slightly larger font in bold-italic.) For each update, the two phases that are changed are removed, re-computed and then added back in. Thus, updating the summed image with a new frame involves: (i) removing the oldest frame from its corresponding phase mean; (ii) adding the new frame to its corresponding phase mean, and (iii) updating the mean over phases with the two modified phases.

In both example methods, with the summed image calculated, deblurring can now be carried out, to remove blurring that is inherent in the super-resolution process, and also any additional blur incurred from the image capture process. The deblurring method used in this example is a Bayesian maximum a-posteriori (MAP) method, which is an iterative method. Every iteration of the deblurring algorithm is computationally expensive and hence, for real-time applications, it is not feasible to iterate to convergence, and instead only a fixed number of iterations are computed. The deblurring algorithm is often described in the literature in lexicographic notation, in which images are expressed as column vectors, which allows an easy exposition of the formulae involved; however, to write software in this way results in very large (but sparse) matrices. It was found that this form was intractable for real-time use and hence all operations are carried out within the image domain (i.e. a blur operation is a convolution rather than a matrix multiplication).

The resultant production of real time super-resolution images allows enhanced performance of, for example, an electro-optical sensor, allowing reductions in cost, weight and development risk. The system can present improved images for example to an operator in the loop or to downstream algorithms.

Aspects of example embodiments of the invention will now be further discussed in more detail.

The first part of most super-resolution (SR) algorithms is image registration, in which multiple low-resolution (LR) images are registered to one another. There are various ways to calculate the translational shift between a pair of images. Correlation in the spatial domain is a robust method but relatively slow to implement, especially for large images. A much faster method, but not as robust for small images, is phase correlation in the frequency domain. In a further, iterative, method the result from one of the two previous methods is used as an initial guess to construct an estimated SR image and the registration is iterated to produce the optimal SR image.

As described above, after calculation of the pixel shifts necessary for image registration, the latest ROI and the latest super-resolved image (in the first embodiment) or the multiple LR images (in the second embodiment) are summed. The LR ROI image is up-scaled to the pixel density desired for SR, using nearest neighbour interpolation. The up-scaled ROI image and the latest super-resolved image (in the first embodiment) or the upscaled images from the stack (in the second embodiment) are then stacked on top of each other at the correct location using the pixel shifts calculated previously. The mean of all the LR pixel values is then taken for each SR pixel, generating a single SR image. That process generates an image that is blurred, even if all the registration parameters are known exactly, and so the final step of the super resolution process is to deblur the mean-value image.

Thus, the first step of a super-resolution algorithm, but a step which is scantly mentioned in the super-resolution literature, is to register a sequence of low resolution images with each other to within sub-pixel accuracy. Three different example methods of aligning the images are described in turn below. All of these example methods assume that the only motion between images is translational motion, with other types of motion such as rotation and scale change not accounted for; that forces each transformation vector to contain two elements, indicative of a horizontal and a vertical translation. Such translational motion could occur for example as a result of jitter at the lens of the camera, caused for example by a camera travelling on a moving vehicle or aircraft, or by target motion within the scene. In the case of a stationary camera with target motion within the scene, the image is close-cropped to the target so that image registration algorithms are not deceived by the stationary background.

It may be that the plurality of images of the target object are obtained from a single platform. The platform may for example be in the form of a vehicle. The platform may for example be in the form of a missile seeker. A single imager may be used to obtain the plurality of images and the further image. It may be that the method is used to track a fast-moving target object within a scene. The target object may for example have a speed, relative to the scene, of more than 30 $ms^{-1}$ and possibly more than 100 $ms^{-1}$. It may be that the images obtained are large enough (e.g. sufficiently wide-angle) as compared to the size of the target object in the image, to track the object within successive images, for the duration required by the particular application to which the method is put, without the need for panning. It may be that, at least for part of the performance of the method, at least some of the images are obtained by a single imager that pans to retain the target object within the field of view of the imager.

In these examples, all images are registered relative to the first image of the sequence. With this choice, the initial transformation vector is equal to zero and all subsequent transformation vectors contain the horizontal and vertical displacement of the current image from image 1. This framework is used in descriptions of the different methods below, in which it is assumed only two images, image 1 and image 2, need to be registered together; the registration process is then repeated for each subsequent image.

Correlation in the spatial domain is an intuitive and robust, yet relatively slow, computational method for image registration. In this method, the two images are overlaid on top of each other at different integer pixel displacements and correlation carried out on the overlapping region. The correlation is, in this example embodiment, computed from the absolute value of the difference between each pair of pixels: the mean of those values, taken across the entire region, gives a measure of how well the two images align (it will be appreciated that different correlation techniques, such as "difference squared" methods could be used in alternative embodiments.). With perfect overlap, the mean pixel difference vanishes, and hence the lower this measure the better the alignment. The process is continued at all integer pixel displacements within a predefined overlap, to build a correlation surface. The predefined overlap can be made larger for an increase in the speed of computation or reduced to allow larger motion to be accounted for; a value of 66% could be chosen for example, i.e. an image is assumed to have translated by less than a third of its width or height.

Upon completion of the correlation surface, the integer pixel displacement of image 2 from image 1 can be computed by finding the location of the minimum value of the array. In order to extend this estimate to include sub-pixel shifts, we consider the correlation surface about this minimum. By fitting a quadratic function through values of the minimum point and the two points adjacent to it, above and below, and subsequently finding the location of the minimum of this function, an estimate of the vertical sub-pixel displacement is obtained; repeating similarly in the horizontal direction provides a complete sub-pixel position. (This example method assumes there is no coupling between the vertical and horizontal directions.)

A very fast (and for large images robust) alternative method of determining the registration of two images is to carry out phase correlation in the frequency domain. This is a well-tested method of calculating integer pixel shifts which has been recently extended to incorporate sub-pixel shifts.

If it is known that two images are identical except for a translation, it is possible to write one as a function of co-ordinates that are shifted by a fixed amount relative to the co-ordinates of the other. The phase correlation matrix is defined as the normalised cross-power spectrum between the Fourier transforms of those functions when so written. Taking the inverse Fourier transform of the phase correlation matrix yields a delta function centred at the translation, and hence yields the translation itself.

Typically, in the case of integer pixel shift, the phase-correlation method provides a much stronger and more detectable peak than that obtained through spatial correlation; however, when dealing with fractional pixel shifts the delta function peak becomes spread over multiple pixels making determination of the shift inaccurate.

One method to overcome this problem is to over-sample the images to higher resolution before carrying out phase correlation; however, this will dramatically increase computational loading. The approach taken in this example is to solve the problem in the frequency domain, and hence to eliminate the need to compute an inverse Fourier transform. In the frequency domain, the only relevant variable is the phase shift, containing the two unknown parameters of the translation. The phase shift, when unwrapped from the inherent 2*pi wrapping, forms a plane which passes through the origin and hence from this plane one can determine the values of the parameters of the translation.

A third approach is to carry out image registration at the same time as optimising the super-resolution image with an iterative method. Assuming an initial registration, which could simply be that each image has zero shift, or using one of the above methods to provide a preliminary estimate, an initial super resolution image is constructed using the stacking method described below. From this estimate of the real world scene the observation model can be applied, without noise or blur terms, to approximate the original LR images. This equates to carrying out averaging over high resolution (HR) pixel blocks to estimate the LR pixel values. These estimated LR images can be compared with the original LR images and the registration adjusted until some cost measure is minimised.

Figure 1:
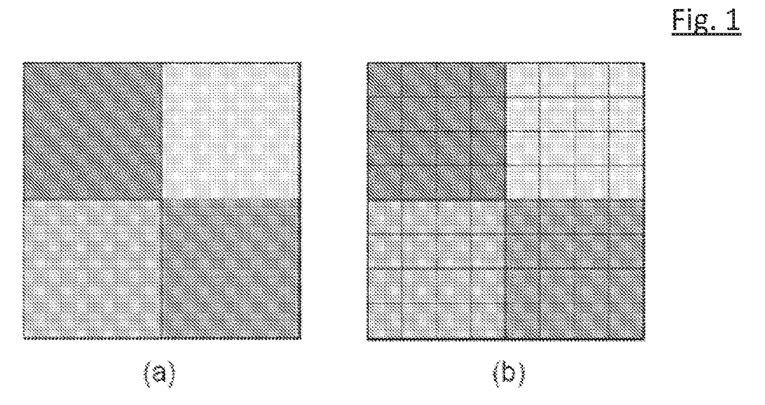
FIG. 1 is a representation of (a) four low-resolution pixels and (b) a corresponding four times sixteen high-resolution pixels.

After generating an estimate of the image registration, a first approximation to a super-resolution image can be constructed by stacking the current ROI on top of the latest super-resolved image (in the first example method) or the images from the stack (in the second example method), one on top of the other, taking into account the relevant pixel shifts. A resolution enhancement factor is chosen to be an integer m, greater than unity, and each LR pixel is divided into m×m HR pixels, which is equivalent to image enlargement by a factor of m using nearest neighbour interpolation. FIG. 1 shows an example of that process, with m=4. FIG. 1(a) shows an exemplary 2×2 grid of low-resolution pixels. FIG. 1(b) shows the corresponding 8×8 grid of high-resolution pixels, following nearest-neighbour interpolation. The value of each pixel of the LR grid is assigned to a 4×4 block of pixels of the HR grid.

The translational shift has been computed on the LR scale and hence must also be multiplied by m to scale it to the HR grid. It is then rounded to the nearest integer, yielding a new shift vector. (In the case of a non-integer shift it is possible to carry out image interpolation to the nearest integer pixel; however, that has the disadvantage that it can introduce information that was not present in the original scene.)

Figure 2:
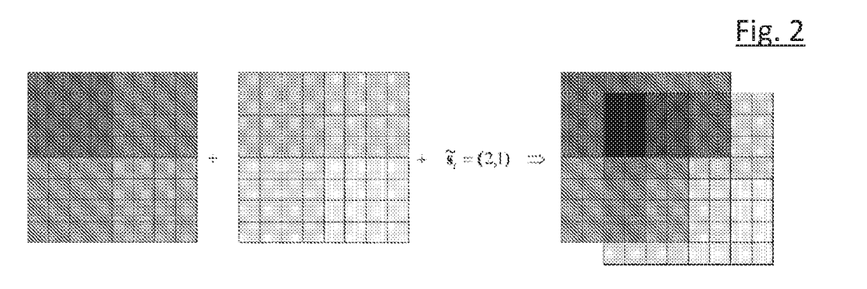
FIG. 2 is a representation of two low-resolution images and their combination.

The up-scaled LR image is subsequently translated by the relevant translational shift vector. As an example, FIG. 2 shows two 8×8 HR grids combined following translation of the second grid relative to the first by two columns of pixels across and one row down. As can be observed in FIG. 2, the region of overlap between images is smaller than each LR image itself and hence extra information for the purpose of super resolution is not gained across the entire image. A choice is therefore made as to how boundary regions are dealt with in the SR algorithm, with options comprising:

Taking only the region of the HR image in which all LR images overlap; with a substantial number of LR images and a wide translational shift this could result in an image with considerably less coverage than the original images;

Taking all pixels including all boundary regions, this could result in a much larger image than the original image; or Taking only the pixels from the original image (i.e. the first image)

In all the work that follows, the third option, taking only pixels that are present in the original image, is chosen. The HR image in this case has pixels around the boundary which do not have contributing pixels from all LR images and also information from LR pixels that fall outside of the original image are discarded. However, this method allows the super-resolved image to be of known size, regardless of the translational shifts, and allows easy comparison with the LR images.

Figure 3:
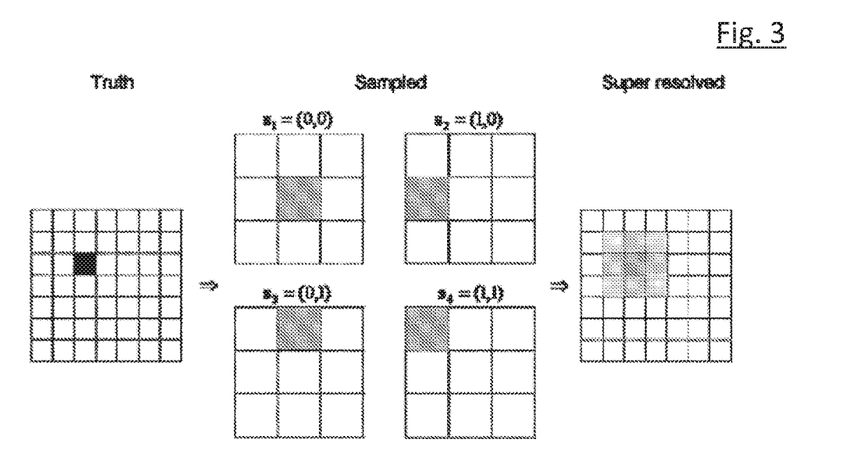
FIG. 3 is an illustration of blurring arising from super-resolution.

The super-resolution image is formed by simply averaging the HR pixels at each location (in the second example method, taking into account how many of the LR images contribute to each pixel). The resulting super-resolution image is a blurry representation of the real world scene, resulting from blur from the optical system and atmospheric turbulence, but also from blur inherent in the simple stacking super resolution process, as shown in FIG. 3. In FIG. 3, a single pixel at location (3,3) in a (high-resolution) 7×7 grid is down-sampled by a scale factor of two, producing four low-resolution images, each shown on a 3×3 sample grid. The down-sampling process takes a 2×2 patch from the HR image and averages the values to form the LR pixel value. The four samples corresponding to displacements of (0,0) (i.e. no displacement), (1,0) (i.e. displacement by one row, (0,1) (i.e. displacement by one column) and (1,1), i.e. displacement by one row and one column. Those are all possible sub-pixel shifts, as any further shifts result in an integer shift on the low-resolution grid, and hence no extra information to assist super-resolution. In the four 3×3 samples, the pixel occurs in location (2,2), (2,1), (1,2) and (1,1), respectively. Applying the super-resolution simple stacking technique accurately locates the pixel at its location (3, 3) in the 7×7 grid, but the image of the pixel is spread into the nine pixels immediately adjacent to that location. If the original pixel is taken to have an intensity value of 16, the sampling and super-resolution blurring process can be understood as follows:

$$\begin{pmatrix} 0 & 0 & 0 & 0 & 0 & 0 & 0 \\ 0 & 0 & 0 & 0 & 0 & 0 & 0 \\ 0 & 0 & 16 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} \Rightarrow$$

$$s_1(0,0): \begin{pmatrix} 0 & 0 & 0 \\ 0 & 4 & 0 \\ 0 & 0 & 0 \end{pmatrix} \; s_2(1,0): \begin{pmatrix} 0 & 0 & 0 \\ 4 & 0 & 0 \\ 0 & 0 & 0 \end{pmatrix}$$
$$s_3(0,1): \begin{pmatrix} 0 & 4 & 0 \\ 0 & 0 & 0 \\ 0 & 0 & 0 \end{pmatrix} \; s_4(1,1): \begin{pmatrix} 4 & 0 & 0 \\ 0 & 0 & 0 \\ 0 & 0 & 0 \end{pmatrix} \Rightarrow \begin{pmatrix} 0 & 0 & 0 & 0 & 0 & 0 & 0 \\ 0 & 1 & 2 & 1 & 0 & 0 & 0 \\ 0 & 2 & 4 & 2 & 0 & 0 & 0 \\ 0 & 1 & 2 & 1 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix}$$

The blur is reduced or eliminated by applying traditional deblurring algorithms, such as a Wiener filter, the Lucy-Richardson algorithm or blind deconvolution, using the point spread function of the simple stacking super-resolution.

Figure 4A:
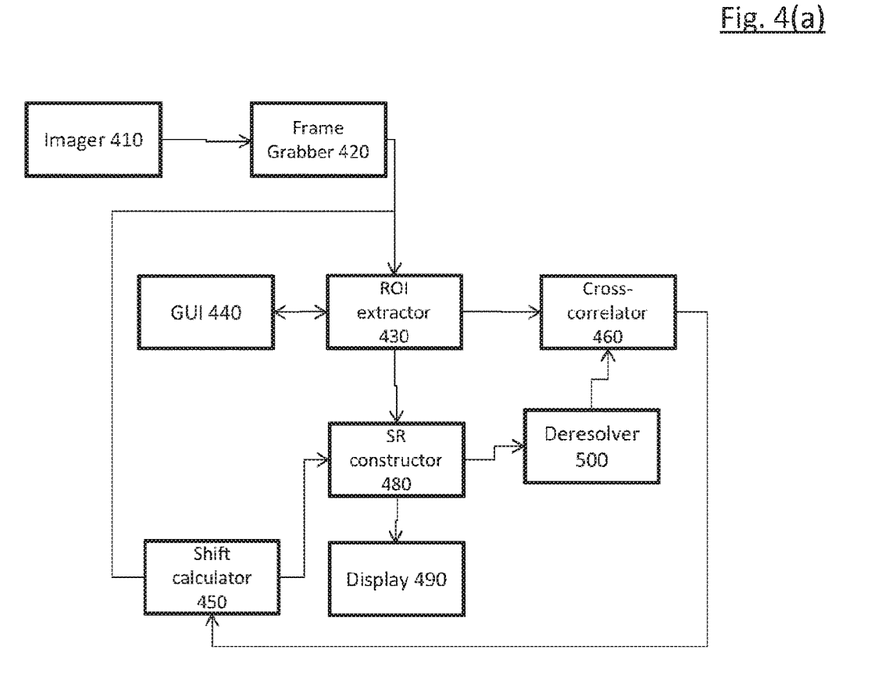

The first example embodiment of the invention will now be described in more detail (FIG. 4(a)). An imager 410—for example an image signal feed from a digital camera mounted on an aerial vehicle—provides a stream of images. Respective images from that stream are extracted by a frame grabber 420 and provided to a Region of Interest extraction module 430. On a first pass of the method, the ROI extraction module 430 interfaces with a user, via a Graphical User Interface 440, to define a region of interest. In subsequent passes, the region of interest is identified using integer shift information provided by a shift calculator 450. The ROI extractor 430 supplies the ROI to a super-resolution module 480, which, using the ROI, fractional shift information from the shift calculator 450 and a current super-resolved image (calculated in the preceding pass of the method), calculates an updated super-resolved image. The updated super-resolved image is presented on a display 490 to a user. The image is also passed to a de-resolution module 500, which in turn passes a de-resolved image to the cross-correlator 460. The output from the cross-correlator 460 is passed to the shift calculator 450.

Figure 5A:
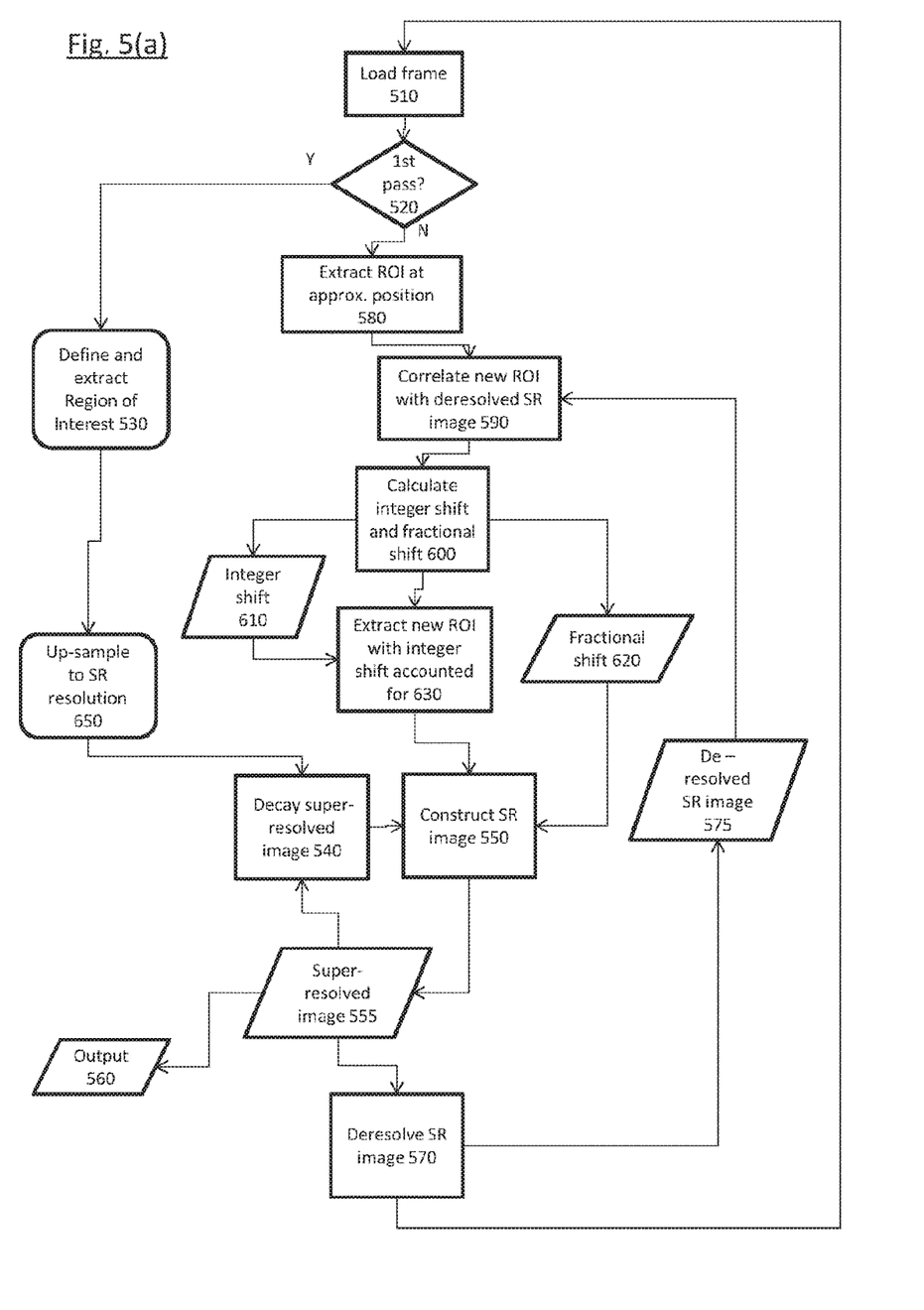

The first example method will now be described in more detail, with reference to FIG. 5(a). An image frame is loaded (step 510) by the frame grabber 420 from the imager 410. The image frame is in the form of an array of pixels. If this is the first pass of the method (decision step 520), a user uses the GUI 440 to identify the location of a target object in the image frame. The user defines in the image frame a portion that is a region of interest including the target object (step 530). Typically, the frame portion will be the pixels making up the target object, together with a small border surrounding the target object, providing a margin in the frame, to allow for future movement of the object in subsequent frames. The pixels corresponding to the identified frame portion (i.e. the region of interest) are extracted by the ROI extractor 430 from the frame. As this is the first pass of the method, the region of interest is up-sampled to the super-resolution resolution and provided to the super-resolution module 480 (step 650).

The super-resolution module 480 provides a decayed super-resolved image (step 540)—as this is the first pass of the method, the decayed super-resolved image is merely the up-sampled ROI.

The super-resolution module 480 constructs a super-resolved image (step 550)—again, as this is the first pass of the method, the super-resolved image is directly related to simply the up-sampled ROI.

The super-resolved image is output to the display 490 (step 560). A "de-resolved" image 575 is calculated (step 570), by a de-resolution module 500, from the "super-resolved" image, for use in subsequent passes; again, in the first pass, the "de-resolved" image 575 is effectively identical to the first frame portion.

After the first pass is completed, the method begins again for a second pass.

A second image frame is loaded by the frame grabber 420 (step 510). A working frame portion is extracted (step 580) from the second image frame by the ROI extractor 430. The working frame portion is extracted from the approximate location of the target object, in this example the same set of pixel locations as were extracted to form the first frame portion.

Next, the working frame portion is cross-correlated (step 590), in the cross-correlator 460, with the de-resolved image produced by the de-resolution module 500 in the first pass of the method. The change in position of the target in the working frame portion compared with the position of the target in the de-resolved first-pass image is thereby calculated by the shift calculator 450 (step 600). That change in position is broken down into a shift of a whole number of pixels (i.e. an integer shift 610) and a shift of a fraction of a pixel (i.e. a fractional shift 620). The integer-shift 610 is used to define a location for a second frame portion, i.e. the location of the first frame portion is translated by the integer shift 610 to give the location for a second frame portion. The pixels forming the second frame portion, corresponding to a re-located region of interest, are extracted (step 630).

A super-resolved image is constructed (step 550) by the super-resolution construction module 480 from the super-resolved image calculated in the first pass of the method (which is merely the frame portion stored in the first pass) and the second frame portion. In the calculation of the super-resolved image, the first frame portion is decayed (step 540) by reducing its weighting; thus, the second frame portion is given a higher weighting than the first frame portion (i.e. $S_{x,y}^2=(1-\alpha)F_{x,y}^2+\alpha S_{x,y}^1=(1-\alpha)F_{x,y}^2+\alpha F_{x,y}^1$). The super-resolved image is output (step 560) to the display 490 for a user. A de-resolved image 575 is calculated (step 570) from the super-resolved image by the de-resolution module 500, and used in the cross-correlator 460 (step 590) for determination of the location of subsequent frame portions.

In subsequent passes, the method carried out in the second pass is repeated, each time using the location of the frame portion of the previous pass as the location of the working frame portion for the present pass, and using the de-resolved image 575 from the previous pass in the cross-correlator 460 to determine the change in position of the target. Thus, a further image frame is loaded (step 510). A working frame portion is extracted from the further image frame (step 580). The working frame portion is extracted from the approximate location of the target object, in this example the same set of pixel locations as were extracted to form the previous frame portion.

In step 590, the working frame portion is cross-correlated with the de-resolved image 575 from the preceding pass of the method. The change in position of the target in the working frame portion compared with the position of the target in the de-resolved image 575 is thereby obtained. That change in position is broken down (step 600) into a shift of a whole number of pixels (i.e. an integer shift 610) and a shift of a fraction of a pixel (i.e. a fractional shift 620). The integer shift 610 is used to define a location for a further frame portion, i.e. the location of the preceding frame portion is translated by the integer shift 610 to give the location for the further frame portion. The pixels forming the further frame portion, corresponding to a re-located region of interest, are extracted (step 630).

The super-resolved image calculated in the preceding pass of the method is decayed (step 540), by reducing the weighting associated with the frame portions generated in each of the preceding passes; thus, the weighting given to each frame portion is progressively reduced on each pass of the method, so that older frame portions have a lower weighting than newer frame portions. A super-resolved image is constructed (step 550) from the decayed super-resolved image and from the current frame portion, $(S_{x,y}^n=\alpha^{n-1}F_{x,y}^1+(1-\alpha)\cdot(\alpha^{n-2}F_{x,y}^2+ \ldots +\alpha F_{x,y}^{n-1}+F_{x,y}^n)=\alpha^{n-1}F_{x,y}^1+(1-\alpha)\Sigma_{p=2}^{n}\alpha^{n-p}F_{x,y}^p$, as discussed above) and output to a user (step 560). A de-resolved image 575 is calculated (step 570) from the super-resolved image, and used in the cross-correlation (step 590) for determination of the location of subsequent frame portions.

Figure 4B:
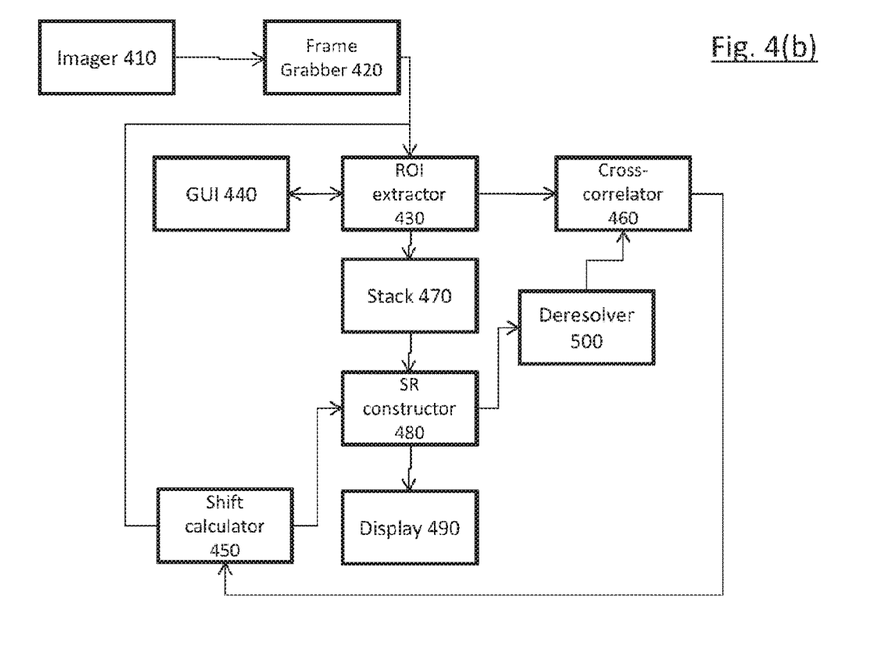

The second example embodiment of the invention will now be described in more detail (FIG. 4(b)). An imager 410—for example an image signal feed from a digital camera mounted on an aerial vehicle—provides a stream of images. Respective images from that stream are extracted by a frame grabber 420 and provided to a Region of Interest extraction module 430. On a first pass of the method, the ROI extraction module 430 interfaces with a user, via a Graphical User Interface 440, to define a region of interest. In subsequent passes, the region of interest is identified using integer shift information provided by a shift calculator 450. The ROI extractor 430 supplies the ROI to a cross-correlator 460 and also stores it on a stack 470. A super-resolution module 480 retrieves stored ROIs from the stack 470 and, using fractional shift information from the shift calculator 450, creates a super-resolved image, which is presented on a display 490 to a user. The image is also passed to a de-resolution module 500, which in turn passes a de-resolved image to the cross-correlator 460. The output from the cross-correlator 460 is passed to the shift calculator 450.

Figure 5B:
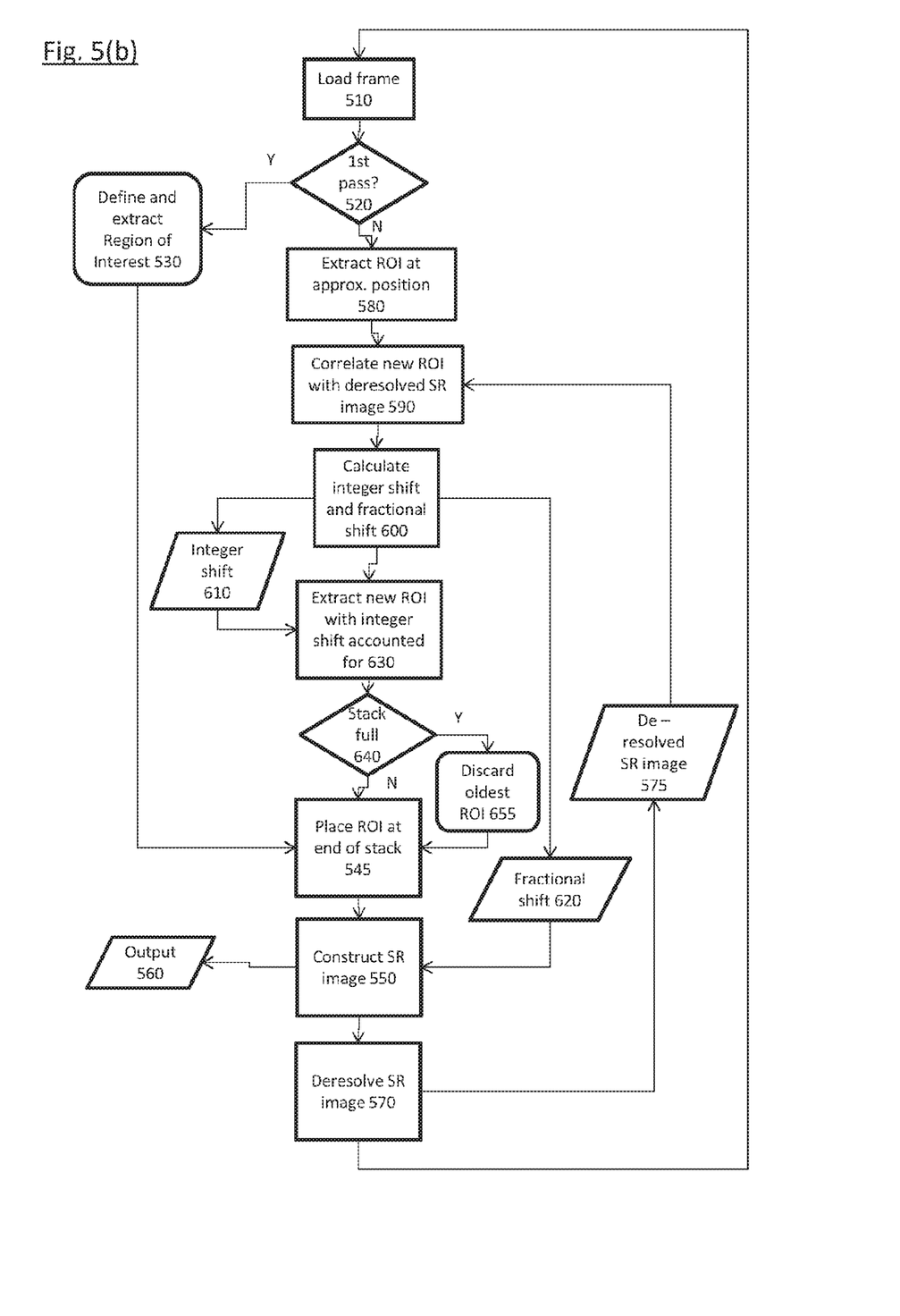
Figure 6:
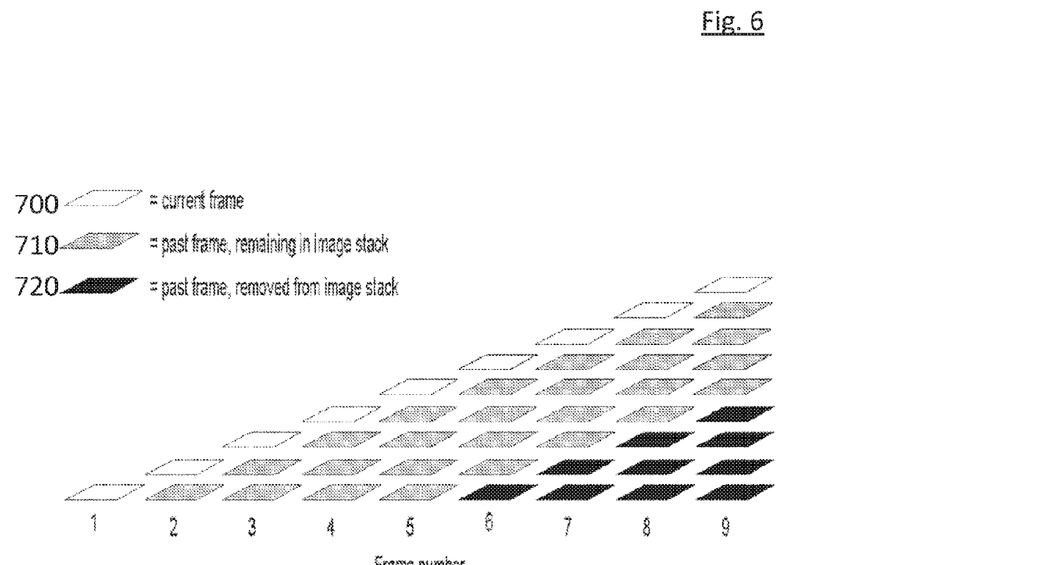
FIG. 6 is a representation of a stack holding four frame portions.

The second example method will now be described in more detail, with reference to FIG. 5(b). An image frame is loaded (step 510) by the frame grabber 420 from the imager 410. The image frame is in the form of an array of pixels. If this is the first pass of the method (decision step 520), a user uses the GUI 440 to identify the location of a target object in the image frame. The user defines in the image frame a portion that is a region of interest including the target object (step 530). Typically, the frame portion will be the pixels making up the target object, together with a small border surrounding the target object, providing a margin in the frame, to allow for future movement of the object in subsequent frames. The pixels corresponding to the identified frame portion (i.e. the region of interest) are extracted by the ROI extractor 430 from the frame and are stored for further processing, by placing them at the end of an image-processing stack 470 (step 545).

A super-resolution module 480 retrieves the images from the stack 470 and constructs a super-resolved image (step 550). On the first pass of the method, only one frame portion has been stored, and so on this first pass the "super-resolved" image is in fact identical to the first frame portion. The super-resolved image is output to the display 490 (step 560). A "de-resolved" image 575 is calculated (step 570), by a de-resolution module 500, from the "super-resolved" image, for use in subsequent passes; again, in the first pass, the "de-resolved" image 575 is identical to the first frame portion.

After the first pass is completed, the method begins again for a second pass.

A second image frame is loaded by the frame grabber 420 (step 510). A working frame portion is extracted (step 580) from the second image frame by the ROI extractor 430. The working frame portion is extracted from the approximate location of the target object, in this example the same set of pixel locations as were extracted to form the first frame portion.

Next, the working frame portion is cross-correlated (step 590), in the cross-correlator 460, with the de-resolved image produced by the de-resolution module 500 in the first pass of the method. The change in position of the target in the working frame portion compared with the position of the target in the de-resolved first-pass image is thereby calculated by the shift calculator 450 (step 600). That change in position is broken down into a shift of a whole number of pixels (i.e. an integer shift 610) and a shift of a fraction of a pixel (i.e. a fractional shift 620). The integer-shift 610 is used to define a location for a second frame portion, i.e. the location of the first frame portion is translated by the integer shift 610 to give the location for a second frame portion. The pixels forming the second frame portion, corresponding to a re-located region of interest, are extracted (step 630). An assessment is made as to whether the stack 470 is full (decision step 640); if it is not, the pixels forming the second frame portion are simply added to the image-processing stack 470 (step 545). Thus, two frame portions have been stored on the stack 470, after the second pass of the method.

A super-resolved image is constructed (step 550) by the super-resolution construction module 480 from the frame portions stored on the stack 470, and output (step 560) to the display 490 for a user. A de-resolved image 575 is calculated (step 570) from the super-resolved image by the de-resolution module 500, and used in the cross-correlator 460 (step 590) for determination of the location of subsequent frame portions.

In subsequent passes, the method carried out in the second pass is repeated, each time using the location of the frame portion of the previous pass as the location of the working frame portion for the present pass, and using the de-resolved image 575 from the previous pass in the cross-correlator 460 to determine the change in position of the target. Thus, a further image frame is loaded (step 510). A working frame portion is extracted from the further image frame (step 580). The working frame portion is extracted from the approximate location of the target object, in this example the same set of pixel locations as were extracted to form the previous frame portion.

In step 590, the working frame portion is cross-correlated with the de-resolved image 575 from the preceding pass of the method. The change in position of the target in the working frame portion compared with the position of the target in the de-resolved image 575 is thereby obtained. That change in position is broken down (step 600) into a shift of a whole number of pixels (i.e. an integer shift 610) and a shift of a fraction of a pixel (i.e. a fractional shift 620). The integer shift 610 is used to define a location for a further frame portion, i.e. the location of the preceding frame portion is translated by the integer shift 610 to give the location for the further frame portion. The pixels forming the further frame portion, corresponding to a re-located region of interest, are extracted (step 630). An assessment is made as to whether the stack 470 is full (decision step 640); if it is not, the pixels forming the further frame portion are simply added to the image-processing stack 470 (step 545).

The stack 470 is of a finite size; in this example, it is able to store 20 frame portions. If the decision step 640 determines that the stack 470 is full, the oldest frame portion in the stack 470 is discarded (step 655), before the further frame portion is added to the stack 470 (step 545).

A super-resolved image is constructed (step 550) from the frame portions stored on the stack 470, and output to a user (step 560). A de-resolved image 575 is calculated (step 570) from the super-resolved image, and used in the cross-correlation step 590 for determination of the location of subsequent frame portions.

A method according to an example embodiment of the invention was applied to infrared sequences of ground targets captured using a cooled, long-wave CEDIP camera. When the first frame of the sequence is loaded, by frame grabber 420, the user is prompted to select on the GUI 440 the top left and bottom right corners of a window enclosing the target which is to be tracked and super-resolved. This window is subsequently cropped by the ROI extractor 430 from the frame, generating a first LR image, and is also cropped from the next frame, generating the second LR frame, and these two frames are then registered. If there is more than an integer pixel shift between the first and second frames, the crop window for the second frame is moved by the integer pixel amount and cropped again to obtain a LR image in which the target has only moved by a sub-pixel displacement relative to the initial frame. This process is repeated for subsequent frames to obtain a stack of LR images in which the target only has sub-pixel displacements from the original image. The process relies on the frame rate of the video sequence being very much greater than the motion of the target, so that the target is fully captured in each cropped window to allow the registration to function reliably. The size of the image stack (or buffer) that needs to be created is another parameter of the problem and should be larger if larger magnifications are sought. Once the image stack is full, then, when moving to a new frame, the oldest image in the stack is discarded and replaced with a new cropped window and super resolution repeated on the new image stack.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the example embodiment described above, the target is identified in the image frame by a user, and the region of interest for which the image portion is extracted is defined by the user. In alternative embodiments, one or both of those operations is automated. For example, the target may be identified in the image frame by a target-recognition algorithm. Similarly, the region of interest, and hence the extracted frame portion, comprising the target object may be defined by a computer around the target object once the location of the target object itself has been identified, whether automatically or by a user. In another example embodiment, a user defines the region of interest after a target-recognition algorithm has identified the target.

In the example embodiment described above, the calculations for producing a "super-resolved" and "de-resolved" image are carried out even on the first pass of the method, which results in the first "super-resolved" and "de-resolved" images being identical to the first stored frame portion. In alternative embodiments, the super-resolution and/or de-resolution calculations are bypassed for the first pass. In some alternative embodiments, the super-resolution and de-resolution calculations are bypassed on each pass until a predefined minimum number of image portions are on the stack, for example until the stack is full.

In the example embodiment described above, the target is relatively slow moving, and the region of interest defined during the first pass is large enough for the working frame portion to be the same set of pixel locations as were extracted from the first frame portion. In alternative embodiments, in which the target moves faster, or in which a smaller region of interest is defined, the likely location of the target is estimated from the presumed movement of the target, or measured using some other tracking algorithm, so that the working frame portion is a region of interest around the estimated likely location of the target. The change in position of the target in the working frame portion compared with the position of the target in the de-resolved image is thereby obtained taking into account, as well as the change in position of the target within the frame portion, the shift in the location of the frame portion itself.

In the example embodiment described above, the super-resolved images are output to a user. In alternative embodiments, the super-resolved images are passed to a further automated unit, where they are used in further automated processes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of tracking an object comprising the steps of:
(i) obtaining from a first imager a plurality of images of a target object;
(ii) calculating by an image processor a super-resolved image of the target object from the plurality of images;
(iii) obtaining from a second imager a further image of the target object, the plurality of images and the further image being obtained at the same viewing angle or at viewing angles of negligible difference;
(iv) de-resolving the super resolved image; and
(v) correlating by the image processor the further image with the de-resolved image, in order to identify the location of the target object in the further image, whereby the, higher quality, super-resolved image may thus be used in order to better identify the location of the target object in the, lower quality, further image.

2. The method of claim 1, in which the correlating is a correlation in the spatial domain.

3. The method of claim 1, in which the correlating is a phase correlation in the frequency domain.

4. The method of claim 1, in which the calculation of the super-resolved image includes averaging all regions of interest in the plurality of images that are of the same phase.

5. The method of claim 1, including the steps of:
(a) extracting a current frame portion from an image from the plurality of images, the frame portion being at least a portion of the pixels forming the image, corresponding to a region of interest in the image, the region of interest comprising the target object;
(b) providing a previously calculated current super-resolved frame portion, corresponding to the region of interest in the image; and
(c) calculating an updated super-resolved frame portion from the current frame portion and the current super-resolved frame portion.

6. The method of claim 5, in which the current super-resolved frame portion is decayed by giving it a lower weighting in the calculation of the updated super-resolved frame portion than a weighting given to the current frame portion.

7. The method of claim 1, in which the calculation of the super-resolved image of the target object from the plurality of images includes the steps of:
(a) providing a stack for storing a predetermined number of frame portions;
(b) obtaining an image including a target object, the image being formed by an array of pixels;
(c) extracting a frame portion from the image, the frame portion being at least a portion of the pixels forming the image, corresponding to a region of interest in the image, the region of interest comprising the target object;
(d) storing the frame portion in the stack, the storing including discarding an oldest previously stored frame portion from the stack if the number of frame portions stored in the stack has reached the predetermined number;
(e) repeating steps (b) to (d) a plurality of times; and
(f) calculating a super-resolved image from the plurality of stored frame portions.

8. The method of claim 7, in which calculating a super-resolved image from the plurality of stored frame portions includes updating a super-resolved image calculated in a previous iteration by changing in the calculation only the phases which have changed in a new frame.

9. The method of claim 5, in which a shift in the position of the target object in successive images is calculated, and the integer part of the calculated shift is used to shift the region of interest in the later image relative to the position of the region of interest in the earlier image.

10. The method of claim 5, in which the region of interest is defined in a first image and then calculated in subsequent images.

11. An image-processing apparatus comprising: (i) an imager for obtaining a plurality of images and a further image, each including a target object and being formed by an array of pixels; and (ii) an image processor configured to: a.

calculate a, higher quality, super-resolved image of the target object from a plurality of images; b. de-resolve the super resolved image; and c. correlate the, lower quality, further image with the, higher quality, de-resolved image, in order to identify the location of the target object in the further image.

12. The image-processing apparatus of claim 11, in which the image-processing apparatus includes a graphical user interface for a user to define the region of interest.

13. A missile seeker including an image processing apparatus according to claim 11.

14. A computer program product embodied on non-transitory computer-readable medium, the product being configured to cause, when the computer program is executed, data-processing apparatus to: (i) receive a plurality of images of a target object; (ii) calculate a, higher quality, super-resolved image of the target object from the plurality of images; (iii) obtain a further image of the target object, the plurality of images and the further image being obtained at the same viewing angle or at viewing angles of negligible difference; (iv) de-resolve the super resolved image; and (v) correlate the, lower quality, further image with the, higher quality, de-resolved image, in order to identify the location of the target object in the further image.

15. The method of claim 1, wherein the first and second imagers are the same imager used in steps (i) and (iii) to obtain the images.

* * * * *